(12) United States Patent
Jia

(10) Patent No.: US 8,027,112 B2
(45) Date of Patent: Sep. 27, 2011

(54) LOW FREQUENCY BOOSTER FOR RV/SHOCK/FRICTION DISTURBANCE REJECTION

(75) Inventor: Qing Wei Jia, Singapore (SG)

(73) Assignee: Hitachi Asia Ltd., Singapore (SG)

( * ) Notice: Subject to any disclaimer, the term of this patent is extended or adjusted under 35 U.S.C. 154(b) by 77 days.

(21) Appl. No.: 12/609,656

(22) Filed: Oct. 30, 2009

(65) Prior Publication Data

US 2011/0102928 A1 May 5, 2011

(51) Int. Cl.
*G11B 5/09* (2006.01)
(52) U.S. Cl. .......................................... 360/39
(58) Field of Classification Search .......... 360/53, 360/39, 57, 58, 48, 43
See application file for complete search history.

(56) References Cited

U.S. PATENT DOCUMENTS

| | | | |
|---|---|---|---|
| 3,997,876 A | 12/1976 | Frush | |
| 4,449,106 A * | 5/1984 | Ishigaki et al. | 333/14 |
| 4,985,925 A * | 1/1991 | Langberg et al. | 381/71.6 |
| 5,136,386 A * | 8/1992 | Okada et al. | 348/622 |
| 5,426,545 A | 6/1995 | Sidman | |
| 5,483,438 A | 1/1996 | Nishimura | |
| 5,636,193 A | 6/1997 | Ohmi | |
| 5,654,840 A | 8/1997 | Patton | |
| 5,663,847 A | 9/1997 | Abramovitch | |
| 6,567,230 B1 * | 5/2003 | Kagami et al. | 360/75 |
| 6,795,559 B1 * | 9/2004 | Taura et al. | 381/94.8 |
| 6,937,423 B1 | 8/2005 | Ngo | |
| 6,958,879 B2 | 10/2005 | Oh | |
| 7,242,225 B2 * | 7/2007 | Klage | 327/106 |
| 7,292,403 B2 | 11/2007 | Baek | |
| 7,319,570 B2 | 1/2008 | Jia | |
| 7,365,932 B1 | 4/2008 | Bennett | |
| 7,400,468 B2 | 7/2008 | Kang | |
| 7,504,990 B2 * | 3/2009 | Isaji | 342/109 |
| 7,545,599 B2 | 6/2009 | Serizawa | |
| 7,564,644 B2 * | 7/2009 | Kim et al. | 360/78.14 |
| 2008/0134787 A1 * | 6/2008 | Asahara et al. | 73/526 |
| 2009/0092337 A1 * | 4/2009 | Nagumo | 382/299 |
| 2010/0004824 A1 * | 1/2010 | Ikeda et al. | 701/42 |
| 2010/0097258 A1 * | 4/2010 | Koli | 341/155 |

FOREIGN PATENT DOCUMENTS

EP 1993007 11/2008

* cited by examiner

*Primary Examiner* — Fred Tzeng
(74) *Attorney, Agent, or Firm* — Occhiuti Rohlicek & Tsao LLP

(57) ABSTRACT

A system for removing low frequency disturbance signals from a control system output. The system includes a controller, a mixer, a feedback loop, and a low pass filter. The controller generates a control signal. The mixer is connected to the controller and receives the control signal from the controller. The feedback loop connects an output of said mixer to an input of the mixer. A low pass filter in the feedback loop allows low frequency disturbance signals in the control signal output from the mixer to pass through the feedback loop and to be added to the control signal by said mixer for handling by the controller.

36 Claims, 7 Drawing Sheets

LOW FREQUENCY BOOSTER FOR RV/SHOCK/FRICTION DISTURBANCE REJECTION

FIELD OF THE DISCLOSURE

This disclosure relates to a system for removing noise from a control system output. More particularly, this disclosure relates to removing low frequency noise from a control system output. Still more particularly, this disclosure relates to a system for removing low frequency noise introduced into a control system output for a hard disk drive that is caused by shock, friction and other outside sources.

BACKGROUND

In today's society, many devices include a controller that generates a control signal that controls movement and/or operation of another component of a device. One example of such a device is a Hard Disk Drive (HDD). In a typical HDD, data is stored on a circular disk. Heads for reading and/writing are located on an arm that is positioned over the disk. A track servo system moves the arm over the disk to position the heads over a particular portion of the disk for reading and/or writing of data to that portion of the disk as the disk is rotated by a motor. A controller generates control signals that are transmitted to the servo system to position the arm over the disk to read and/or write desired data.

As technology has advanced, HDDs have become smaller and are included in more devices. As the HDDs have become smaller, a problem encountered is that the servo systems in HDDs are required to hold read/write heads to very small off-track errors to support the increasing track density of disks. Tracking errors can be induced due to many effects including disk and bearing run-out; servo-track-writer induced irregularities; electronic noise; spindle and actuator resonances; and external shock and vibration excitations. The tracking errors cause noise in the control signal applied to the servo system by the controller. The controller monitors the signal applied to the plant to correct the signal to account for the noise added by these tracking errors.

Typically, the tracking errors induced by disk and bearing run-out; servo-track-writer induced irregularities; electronic noise; and spindle and actuator resonances cause high frequency noise in the control signal. The controller can adjust the control signal applied to remove this noise. However, tracking errors from external shock and vibration excitations are typically low frequency noise in the control signals. In the past, observer circuitry had to be added to the control signal circuit to reduce the low frequency error signals. The observer circuitry estimates the low frequency noise and tries to attenuate the low frequency noise from the control signal. The observer circuitry often requires a lot of real estate in the control circuitry adding to the cost and complexity of the design. An example of prior art observer circuitry is provided in U.S. Pat. No. 7,319,570 issued in the name of Jia et al. entitled "Random Vibration and Shock Compensator Using a Disturbance Observer".

The low frequency noise is a particular problem in small form factor HDDs used in portable environments where there is an increased exposure to continuous shocks and random vibration due to daily activities like jogging, cycling, etc. Portable devices, such as MP3 players, require a smooth flow of music without interruption during jogging. External shocks to the portable device may cause the read/write head in the disk drive to move off-track due to mechanical imbalance of the actuator. Hence, the inability of the HDD to load information from drive to memory buffer. If the drive cannot recover fast enough from shocks, the system will hang. The hanging causes a portable device, such as a MP3 player, to stop operating. To make the disk drive embedded in the portable device suitable for these types of uses, the read/write head must be able to recover from shocks quickly before the next shock arrives. Thus, those skilled in the art are constantly striving to provide a system to remove the low frequency noise from control signals induced by these types of uses while reducing the amount of real estate or space needed in the control signal circuitry.

SUMMARY

The above and other problems are solved and an advance in the art is made by a low frequency booster for random vibration (RV)/shock/friction disturbance rejection as disclosed herein. A first advantage of this disclosed system is that it does not require a sample of an output signal from a plant. This reduces the amount of real estate or space the system requires in control signal circuitry. A second advantage is that the simplicity of the circuitry makes the system more reliable than conventional observer circuitries.

In accordance with some embodiments, a control signal circuit includes a mixer. One input of the mixers receives a control signal generated by a controller. A feedback loop connects an output of the mixer to a second input of the mixer. A low pass filter in the feedback loop only allows low frequency signals to pass through the feedback loop. The mixers then add the low frequency signals to the control signal to increase the amplitudes of the low frequency signals which counteracts the external low frequency disturbances.

In accordance with other embodiments, a delay circuit is added to the feedback loop to account for computational delays.

In accordance with yet other embodiments, a hold circuit may receive the control signal output by the mixer. In some preferred embodiments, the hold circuit is between the output of the mixer and the input of a plant receiving the control signal.

In accordance with additional embodiments, a sample circuit captures the output of the system. In some preferred embodiments, the sample circuit receives a signal output from the plant.

In accordance with still other embodiments, the system may include a feedback loop that applies the control signal, applied to the plant, to the controller to allow the controller to generate a control signal based on the control signal being applied to the plant.

In accordance with other embodiments, the low pass filter is one of multiple low pass filters. In accordance with some of these embodiments, a switch connects one of the multiple low pass filters to the feedback loop between an output and a second input of the mixer. In some of these further embodiments, a switch controller controls the switch to selectively connect one of the low pass filters. Furthermore, the low pass filters are each of a different order.

In accordance with these embodiments, a low pass filter having a lower order is connected in the feedback loop for better rejection/to improve gain of said low frequency disturbance signals. A low pass signal having a higher order is connected into the feedback loop for concern about system stability.

BRIEF DESCRIPTION OF THE DRAWINGS

The above and other features and advantages of a system in accordance with this system are described in the below detailed description and are shown in the following drawings.

DETAILED DESCRIPTION

This disclosure relates to a system for removing noise from a control system output, and more particularly, to removing low frequency noise from a control system output. Still more particularly, this disclosure relates to a system for removing low frequency noise introduced into a control system output for a HDD that is caused by shock, friction and other outside sources. For purposes of clarity, components shown in more than one drawing are given the same reference number throughout the entirety of this description.

A boost system in accordance as disclosed herein is used to feedback the low frequency disturbance signals to increase the amplitude of the low frequency disturbance signals in the control signal that allows for compensation of the low frequency disturbances in the generated control signals. For purposes of this discussion, a plant is any circuit that receives the control signal to perform a certain function. Examples of a plant include, but are not limited to, a servo system in a HDD. The system described herein greatly simplifies the circuitry needed to handle low frequency disturbance signals. These low frequency disturbance signals are typically generated by shocks and random vibrations caused by activities such as jogging, cycling, etc.

Figure 1:
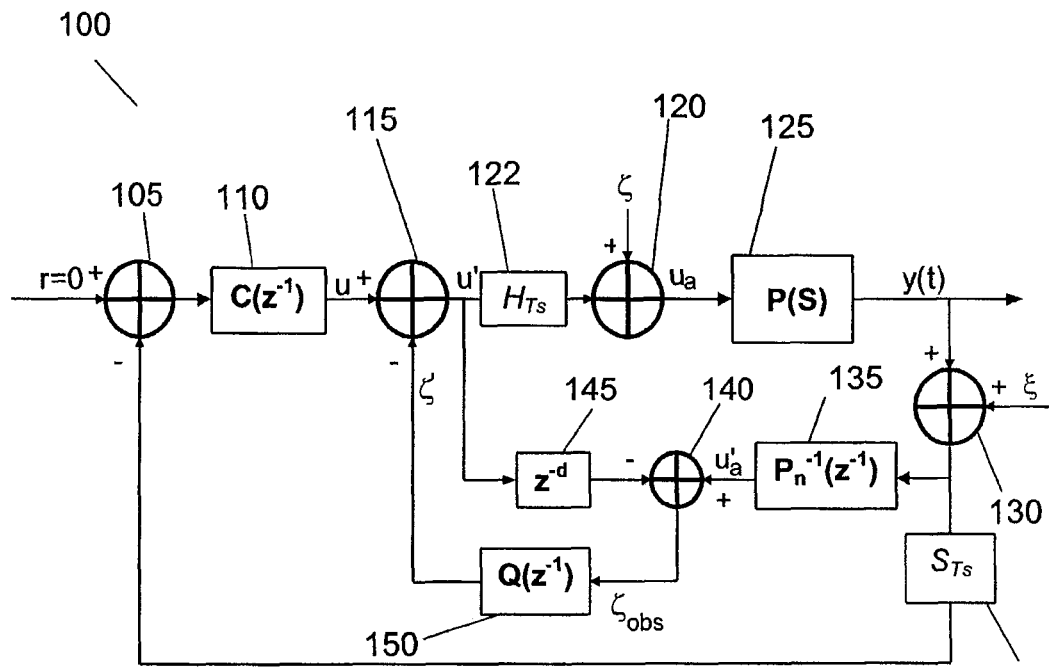
FIG. 1 illustrates a prior art observer circuit for removing low frequency disturbance signals.

One approach to the handling of low frequency disturbance signals is to provide disturbance observer circuitry that determines the low frequency disturbance signals and generates an attenuation signal that is then mixed with the control signal to attenuate low frequency disturbance signals in the drive signal. FIG. 1 illustrates a control signal system 100 that includes disturbance observer circuitry for attenuating low frequency disturbance signals.

System 100 includes a controller 110 that generates a control signal, u, from a reference signal and a sample of the control signal previously applied to plant 125 that are received from mixer 105. Controller 110 is conventional circuitry for generating a control signal through either analog or digital means. The exact workings and components of controller 110 are omitted, for brevity, as the workings and components of controller 110 are not important for understanding this disclosure. An input of mixer 115 receives the control signal, u, from controller 110.

An output of mixer 115 applies a corrected control signal, u', to the observer circuit and to plant 125. The corrected control signal, u', is applied to delay 145. Delay 145 is circuitry that delays the propagation of the corrected control signal through the circuitry to account for computational and propagation delays. The delayed corrected control signal is then received by a first input of mixer 140. A second input of the mixer 140 receives an inverse plant signal from inverse plant signal generator 135.

Inverse plant signal generator 135 receives the control signal applied to plant 125 and generates an inverse signal. Mixer 140 receives the inverse control signal and the corrected control signal and adds the signals together to form an error correction signal. Low pass filter 150 receives the error correction signal from the output of mixer 140. Low pass filter 150 then removes high frequency disturbance signals from the error correction signal. The low frequency disturbance signals remaining in the error correction signal are then received by a second input of mixer 115 that is connected to an output low pass filter 150. Mixer 115 then mixes the low frequency disturbance signals remaining in the corrected error signal with the control signal, u, received from control 110 to generate the corrected control signal u'.

The corrected error signal from the output of mixer 115 is then applied to hold circuit 122 to apply the signal to plant 125. Hold circuit 122 converts the digital signal from the output of mixer 115 into an analog signal to control the plant 125. Representative mixer 120 is not physically part of control signal circuit 100. However, representative mixer 120 is provided to show that corrected control signal is subjected to the introduction of low frequency disturbance signals. The signals are typically generated by external shock and vibrations of system 100. The corrected error signal, including the added low frequency disturbance signals, is applied to plant 125. Plant 125 then performs a function in accordance with the received error signal. The actual workings of plant 125 are omitted for brevity, as an understanding of the workings of plant 125 is unimportant for an understanding of this disclosure.

The control signal applied to plant 125, y(t), is output for use by controller 110 in generating the control signals. Representative mixer 130 is not physically part of control signal circuit 100. However, representative mixer 130 is provided to show that the control signal applied to plant 125 is subjected to the introduction of high frequency disturbance signals. The signals are typically generated by irregularities; electronic noise; and spindle and actuator resonances in plant 125. Sample circuit 132 captures a sample of the control signal applied including the noise injected into the signals from other sources as shown by representative mixers 120 and 130.

The applied control signal, including both high and low frequency disturbance signals, is applied to an input of mixer 105 for mixing in the reference signal as described above. A more complete description of control signal circuitry 100 is provided in U.S. Pat. No. 7,319,570 issued in the name Jia et al. entitled "Random Vibration and Shock Compensator Using a Disturbance Observer".

In operation, control signal circuit 100 shown in FIG. 1 operates in the following manner. Plant 125, P(s), is subject to external RV/shock disturbance signals, $\zeta$, and measurement noise signals, $\xi$ as shown by representative mixers 120 and 130. A nominal model of P(s) is assumed to be known. A sampled plant model control signal is denoted as $P(z^{-1})$, as the sampled plant model control signal is a digital representation of P(s) as determined by a Digital Signal Processor (DSP) (Not Shown). The inverse plant model is denoted by $P_n^{-1}(z^{-1})$. Low pass filter (LPF) 150, $Q(z^{-1})$, known as a Q-filter, is used to filter out high frequency contents in the observed disturbance signal $\zeta_{obs}$, referred to as the correction signal above. The correction signal, $\zeta'$, contains only the low frequency signals of the observed disturbance signal, $\zeta_{sobs}$, and is obtained to counteract the effect of the disturbance signal, ζ. Delay 145 is a d step delay and is introduced to compensate for the phase loss due to computational and other delays.

Low pass filter 150 is a low-pass filter with unity dc gain. Thus, low pass filter 150 attenuates the high frequency signals in the disturbance signal cause by sensor noise and at the same time, cancels the low frequency signals in the disturbance signal cause by RV/shock. As can be seen, the disturbance observer circuitry requires an inverted model of the plant P, which is usually difficult to obtain for the low frequency range. Thus, the practical applications of these types of compensation methods based on disturbance observer are limited.

From the above description, it can be seen that $u'_a$ due to the disturbance, ξ, at low frequencies is calculated by the following equation:

$$u'_a = G_{\xi y}(z^{-1})P_n^{-1}(z^{-1})\varsigma \quad (0.1)$$
$$= \frac{(1-Q(z^{-1})z^{-d})P(z^{-1})P_n^{-1}(z^{-1})\varsigma}{1+P(z^{-1})C(z^{-1})+Q(z^{-1})(P(z^{-1})P_n^{-1}(z^{-1})-z^{-d})}$$
$$\approx \frac{(1-Q(z^{-1})z^{-d})\varsigma}{1+P(z^{-1})C(z^{-1})}$$

where:
$G_{\xi y}$ is the transfer function from the disturbance, ξ, to the plant output y; and
$C(z^{-1})$ is a stable digital controller.

In the above equation, it can be seen that as $1-Q(z^{-1})z^{-d}\approx 0$ and the amplitude of the sensitivity function, $S=1/(1+PC)$, becomes very small at low frequencies, the value of $u'_a$ becomes very small and the contribution to $u'_a$ becomes relatively insignificant. Therefore, it is reasonable to remove the path from y(t) to $u'_a$, that includes the inverse plant signal generator 135, from the disturbance observer to simplify the implementation.

The system described herein relies on the fact that if inverse plant signal generator 135 is removed from the disturbance observer, the disturbance observer is simplified into a positive feedback loop to create a new scheme. The new scheme, which is referred to as a low frequency booster scheme, greatly enhances the open loop gain at low frequencies. The improvements of gain can be easily seen from the transfer function of the loop from u to u':

$$G_{uu'}(z^{-1}) = \frac{1}{1-Q(z^{-1})z^{-d}} \quad (0.2)$$

where:
$z^{-d}$ represents a d-step delays.

When $Q(z^{-1})$ is chosen to be a low-pass filter with unity dc gain, the amplitude of $G_{uu'}$ is well enhanced at low frequencies and approaches infinity as the frequency approaches zero. The transfer function from ξ to y becomes:

$$G_{\xi y}(z^{-1}) = \frac{(1-Q(z^{-1})z^{-d})P(z^{-1})}{1+P(z^{-1})C(z^{-1})-Q(z^{-1})z^{-d}} \quad (0.3)$$

One skilled in the art will recognize that at low frequencies, $1-Q(z^{-1})z^{-d}\approx 0$ and $G_{\xi y}\approx 0$; and at high frequencies, $Q\approx 0$ and $$G_{\xi y}(z^{-1}) \approx \frac{P(z^{-1})}{1+P(z^{-1})C(z^{-1})} \quad (0.4)$$

Thus, Eqn. (0.4) shows that a booster has insignificant effect on the control system 200 at higher frequencies.

Figure 2:
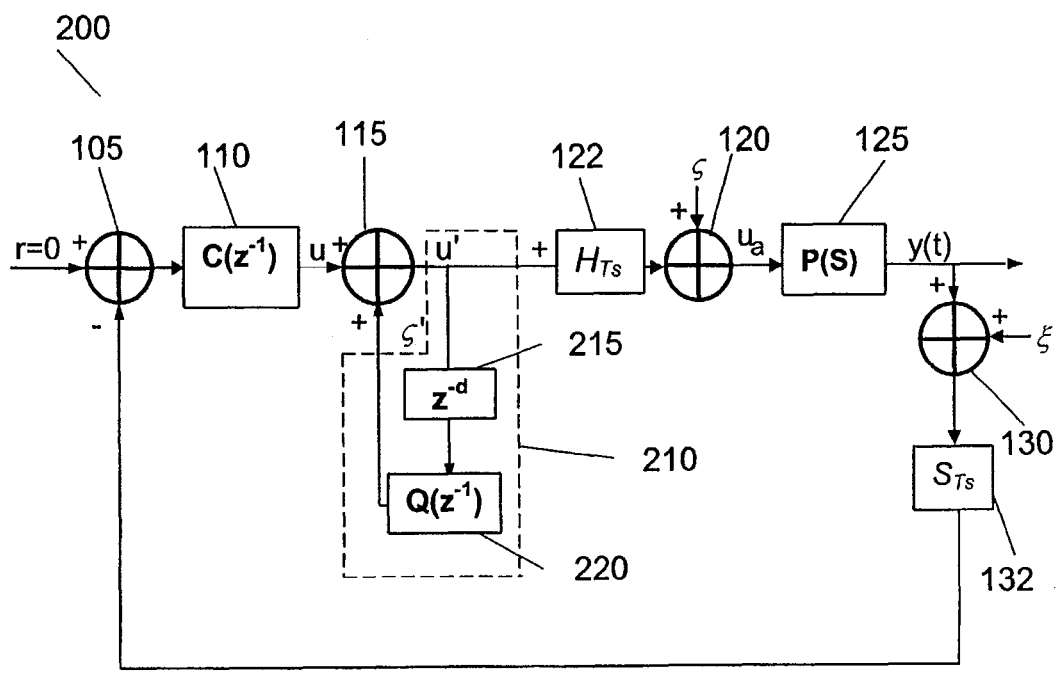
FIG. 2 illustrates a control signal circuit including a boost system in accordance with one embodiment.

FIG. 2 illustrates control signal circuitry 200 that includes a feedback loop 210 that differs from that shown in FIG. 1. System 200 includes a controller 110 that generates a control signal, u, from a reference signal and a sample of the control signal previously applied to plant 125 that are received from mixer 105. Controller 110 is conventional circuitry for generating a control signal through either analog or digital means. The exact workings and components of controller 110 are omitted, for brevity, as the workings and components of controller 110 are not important for understanding this disclosure. An input of mixer 115 receives the control signal, u, from controller 110.

An output of mixer 115 applies a corrected control signal, u', to the feedback loop 210 and to plant 125. In feedback loop 210, the corrected control signal, u', is applied to delay 215. Delay 215 is circuitry that delays the propagation of a control signal through the circuit to account for computational and propagation delays.

Low pass filter 220 receives the corrected control signal from delay 215 and subsequently removes the higher frequency signals from the corrected control signal. The low frequency disturbance signals remaining in the corrected control signal are then received by a second input of mixer 115 that is connected to an output of low pass filter 220. Mixer 115 then mixes the low frequency disturbance signals remaining in the corrected error signal with the control signal, u, received from control 110, to generate the corrected control signal u'.

The corrected error signal from the output of mixer 115 is then applied to hold circuit 122 to apply the signal to plant 125. The hold circuit 122 converts the digital signal from the output of mixer 115 into an analog signal to control the plant 125. Representative mixer 120 is not physically part of control signal circuit 200. However, representative mixer 120 is provided to show that the corrected control signal is subjected to the introduction of low frequency disturbance signals. The signals are typically generated by external shock and vibrations of system 200.

The corrected error signal, including the added low frequency disturbance signals is applied to plant 125. Plant 125 then performs a function in accordance with the received error signal. The actual workings of plant 125 are omitted for brevity as an understanding of the workings of plant 125 is unimportant for an understanding of this disclosure.

The output of plant 125, y(t), is used by controller 110 in generating the control signals. Representative mixer 130 is not physically part of control signal circuit 200. However, representative mixer 130 is provided to show that the control signal applied to plant 125 is subjected to the introduction of high frequency disturbance signals. The signals are typically generated by irregularities; electronic noise; and spindle and actuator resonances in plant 125. Sample circuit 132 captures a sample of the control signal applied including the noise injected into the signals from other sources as shown by representative mixers 120 and 130. The applied control signal, including both high and low frequency disturbance signals, is then applied to an input of mixer 105 for mixing in the reference signal as described above.

One skilled in the art will recognize that low gain enhancement with an additional integrator is a special case of a boost system as described herein. For simplification of discussion, $Q(s)$, the counterpart in continuous-time of the digital low-pass filter $Q(z^{-1})$ is used. When $Q(s)$ is chosen to be of the first order, namely, $Q(s)=b/(s+b)$, where b is the bandwidth of $Q(s)$, without considering the delay term $z^{-d}$ in the proposed diagram, the gain enhancement due the positive feedback is:

$$G_{uu'} = \frac{1}{1-Q(s)} = 1 + \frac{b}{s}(0.5)$$

The order of the Q filter has significant effect on the disturbance rejection performance. Lower order Q filters provide better disturbance rejection performance. In contrast, higher order Q filters provide more stability margins. Therefore, a second embodiment provides multiple switches and a switch for selectively connecting one of the filters to the feedback loop. The multiple filters and switch enable a selection to be made that trades off between disturbance rejection capability and stability margins. The switch may receive signals from a switch control (Not Shown) to select a filter with the proper bandwidth or order according to the RV disturbance or Position Error Signal (PES). For example, when the system has a high PES/RV level, a lower order Q filter is selected for better disturbance rejection performance. However, when the PES/RV level in the system is low, a Q filter with higher order is selected for better stability margins.

Figure 3:
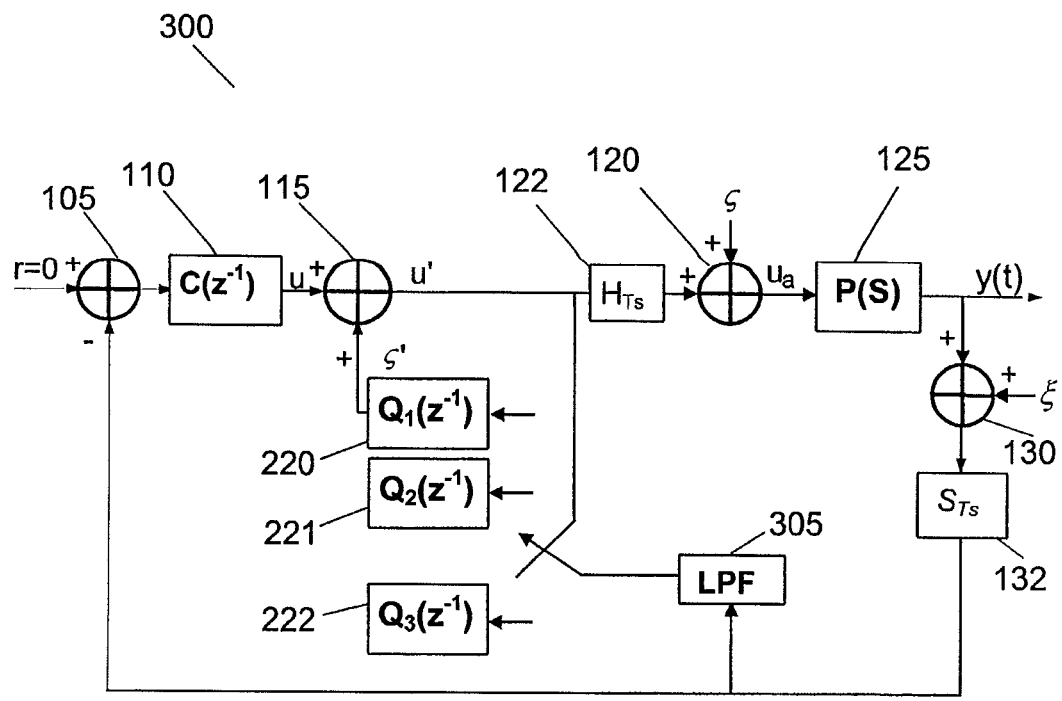
FIG. 3 illustrates a control signal circuit including a boost system in accordance with a second embodiment.

FIG. 3 illustrates a control signal system 300 that includes a switch and a plurality of low pass filters. System 300 includes a controller 110 that generates a control signal, u, from a reference signal and sample of the control signal previously applied to plant 125 that are received from mixer 105. Controller 110 is conventional circuitry for generating a control signal through either analog or digital means. The exact workings and components of controller 105 are omitted, for brevity, as the workings and components of controller 105 are not important for understanding this disclosure. An input of mixer 115 receives the control signal, u, from controller 110.

An output of mixer 115 applies a corrected control signal, u', to the feedback loop and to plant 125. The feedback loop includes switch 305 that selectively connects one of low pass filters 220-222 into the feedback loop. Each of low pass filters 220-222 is of a different order. In the shown embodiment, low pass filter 220 is a first order low pass filter, low pass filter 221 is a second order low pass filter, and low pass filter 222 is an nth order low pass filter.

The selectively connected low pass filter 220-222 receives the corrected error signal and removes high frequency disturbance signals from the corrected control signal. The low frequency disturbance signals remaining in the correct control signal are then received by a second input of mixer 115 that is connected to an output of the connected low pass filter 220-222. Mixer 115 then mixes the low frequency disturbance signals remaining in the corrected error signal with the control signal, u, received from controller 110 to generate the corrected control signal u'.

The corrected error signal from the output of mixer 115 is then applied to hold circuit 122 to applying the signal to plant 125. The hold circuit 122 converts the digital signal from the output of mixer 115 into an analog signal to control the plant 125. Representative mixer 120 is not physically part of control signal circuit 300. However, representative mixer 120 is provided to show that corrected control signal is subjected to the introduction of low frequency disturbance signals. The signals are typically generated by external shocks and vibrations of system 300. The corrected error signal, including the added low frequency disturbance signals, is applied to plant 125. Plant 125 then performs a function in accordance with the received error signal. The actual workings of plant 125 are omitted for brevity as an understanding of the workings of plant 125 is unimportant for an understanding of this disclosure.

The output of plant 125, y(t), is used by controller 110 in generating the control signals. Representative mixer 130 is not physically part of control signal circuit 300. However, representative mixer 130 is provided to show that the control signal applied to plant 125 is subjected to the introduction of high frequency disturbance signals. The signals are typically generated by irregularities; electronic noise; and spindle and actuator resonances in plant 125. Sample circuit 132 captures a sample of the control signal applied including the noise injected into the signals from other sources as shown by representative mixers 120 and 130. The applied control signal, including both high and low frequency disturbance signals, is applied to an input of mixer 105 for mixing in the reference signal as described above.

Figure 4:
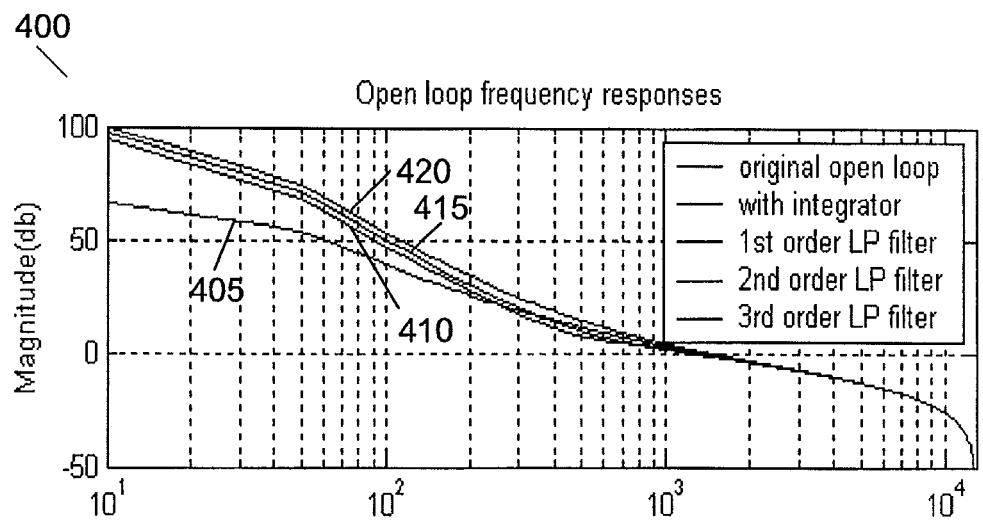
FIG. 4 illustrates a graph showing the magnitude of open loop frequency response.

FIG. 4 illustrates a graph 400 of open loop frequency response, in terms of log-magnitude, using different orders of low pass filters where the bandwidth of the filters is set to 500 Hz. Line 405 shows the response of an open loop system with no filter. Line 420 shows the response using a first order low pass filter or the special case of an added integrator. Line 415 shows the response using a second order low pass filter. Line 410 shows the response using a third order low pass filter.

Figure 5:
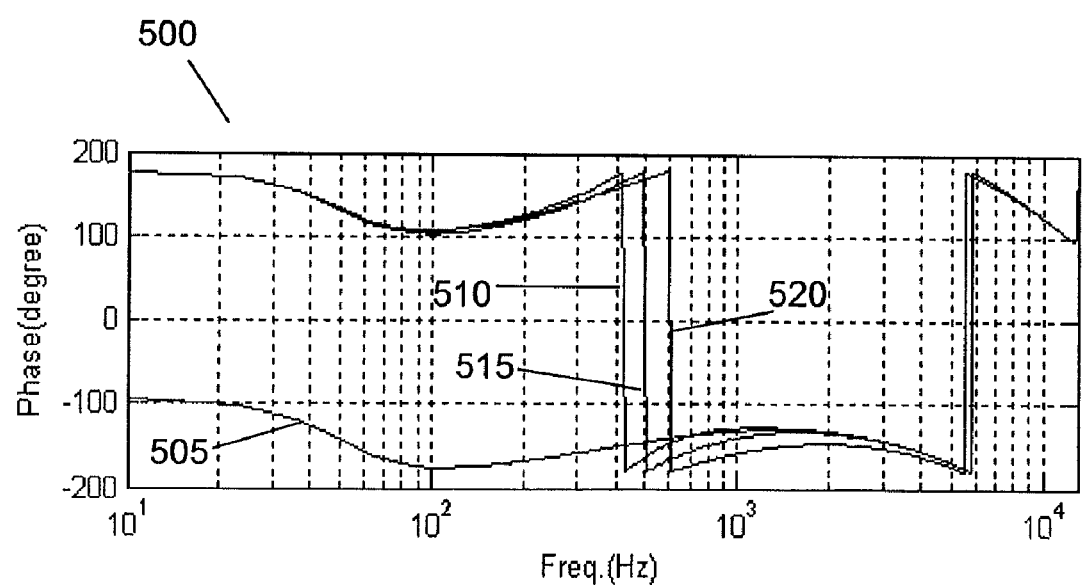
FIG. 5 illustrates a graph showing the phase of open loop frequency response.

FIG. 5 illustrates a graph 500 of open loop frequency response, in terms of phase, using different orders of low pass filters where the bandwidth of the filters is set to 500 Hz. Line 505 shows the response of an open loop system with no filter. Line 520 shows the response using a first order low pass filter or the special case of an added integrator. Line 515 shows the response using a second order low pass filter. Line 510 shows the response using a third order low pass filter.

Figure 6:
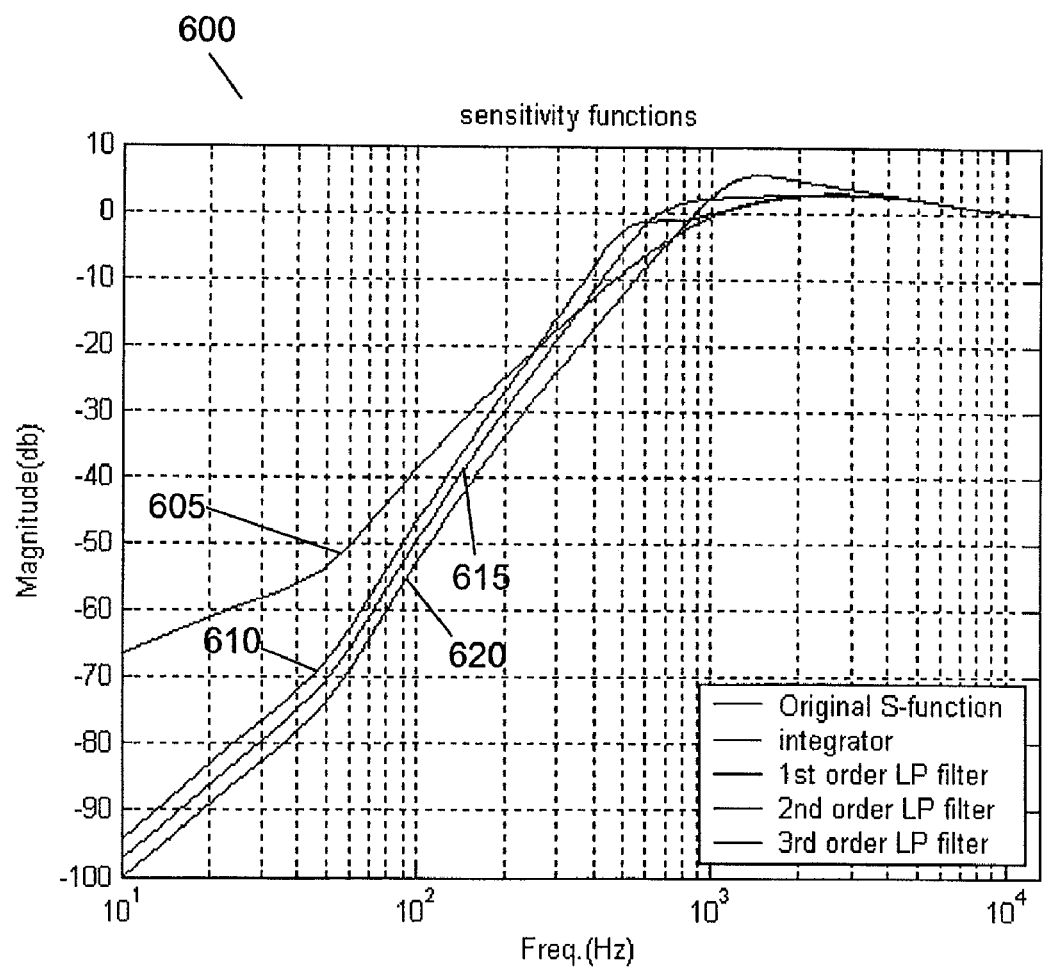
FIG. 6 illustrates a graph showing of open loop sensitivity frequency response.

FIG. 6 illustrates a graph 600 of sensitivity frequency response using different orders of low pass filters where the bandwidth of the filters is set to 500 Hz. Line 605 shows the sensitivity frequency response of an open loop system with no filter. Line 620 shows the response using a first order low pass filter or the special case of an added integrator. Line 615 shows the response using a second order low pass filter. Line 610 shows the response of using a third order low pass filter.

From graphs 400; 500; and 600, one skilled in the art will recognize that the use of an integrator greatly improves rejection performance at low frequencies, such as frequencies below 1,000 Hz. However, disturbance amplification at medium frequency range (1 KHz to 3 KHz) and loss of phase margins are significant. This is shown in the following table showing the stability margins:

| | Stability margins | | | | |
|---|---|---|---|---|---|
| Schemes | o | I | 1 | 2 | 3 |
| PM(degree) | 49.8 | 30.5 | 30.5 | 44.7 | 51.9 |
| GM(db) | 15.15 | 14.37 | 14.37 | 15.19 | 15.15 |

Where:

scheme o refers to the original servo system without any additional compensation scheme I refers to the scheme with an additional integrator; and schemes 1-3 refer to the proposed schemes with the low pass filter chosen to be $1^{st}$, $2^{nd}$ and $3^{rd}$, orders respectively.

Figure 7:
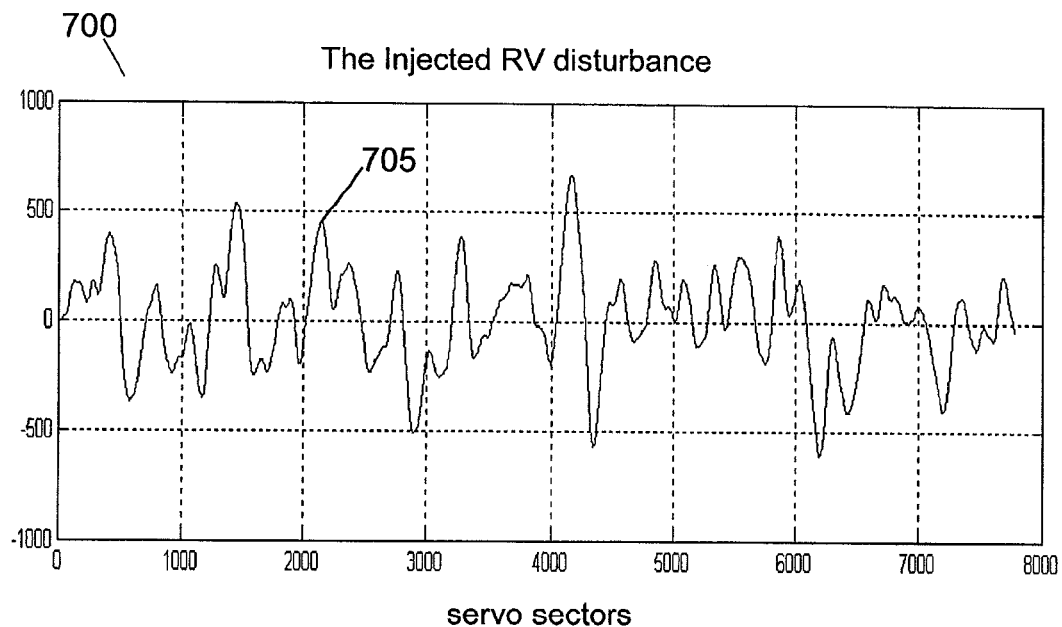
FIG. 7 illustrates a graph showing the noise injected into a system.
Figure 8:
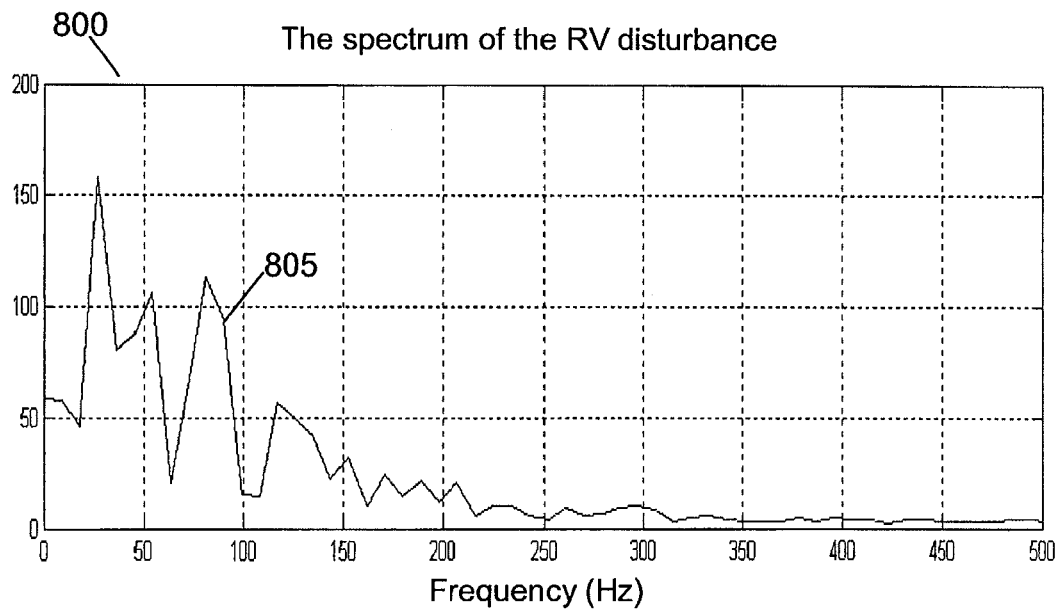
FIG. 8 illustrates a graph showing the spectrum of the noise injected into a system.

FIG. 7 illustrates graph 700 showing the noise 705, which is a band-limited white noise with 100 Hz bandwidth, injected into a system to generate graphs 400, 500, and 600. FIG. 8 illustrates graph 800 showing the spectrum 805 of the noise 705 injected into the system to generate graphs 400, 500, and 600.

Figure 9:
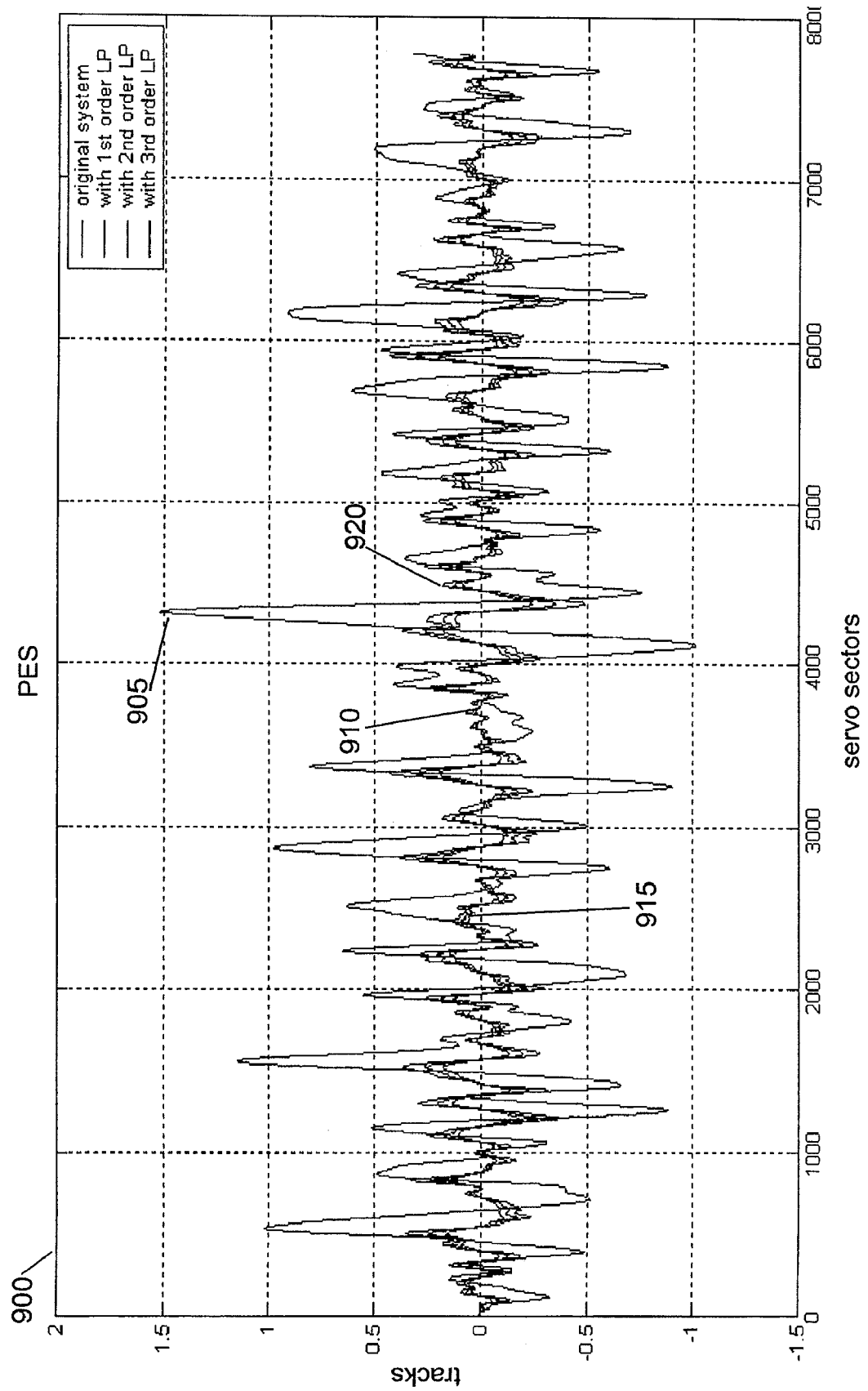
FIG. 9 illustrates a graph showing disturbance rejection at low frequencies.

The following table shows variation of PES signals for a system as described herein using different order low pass filters:

| Variations of PES signals | | | | | |
|---|---|---|---|---|---|
| Schemes | o | I | 1 | 2 | 3 |
| sigma | 108.66 | 19.26 | 19.24 | 28.58 | 40.08 | where:

variation σ is calculated using Matlab function std( )

scheme o refers to the original servo system without any additional compensation;

scheme I refers to the scheme with an additional integrator; and schemes 1-3 refer to the proposed schemes with the low pass filter chosen to be $1^{st}$, $2^{nd}$ and $3^{rd}$, orders respectively FIG. 9 illustrates graph 900 showing the PES using different order low pass filters in a feedback loop as described herein. Line 905 shows the response of an open loop system with no filter. Line 910 shows the PES signal using a first order low pass filter or the special case of an added integrator. Line 915 shows the PES signal using a second order low pass filter. Line 920 shows the PES signal using a third order low pass filter.

Figure 10:
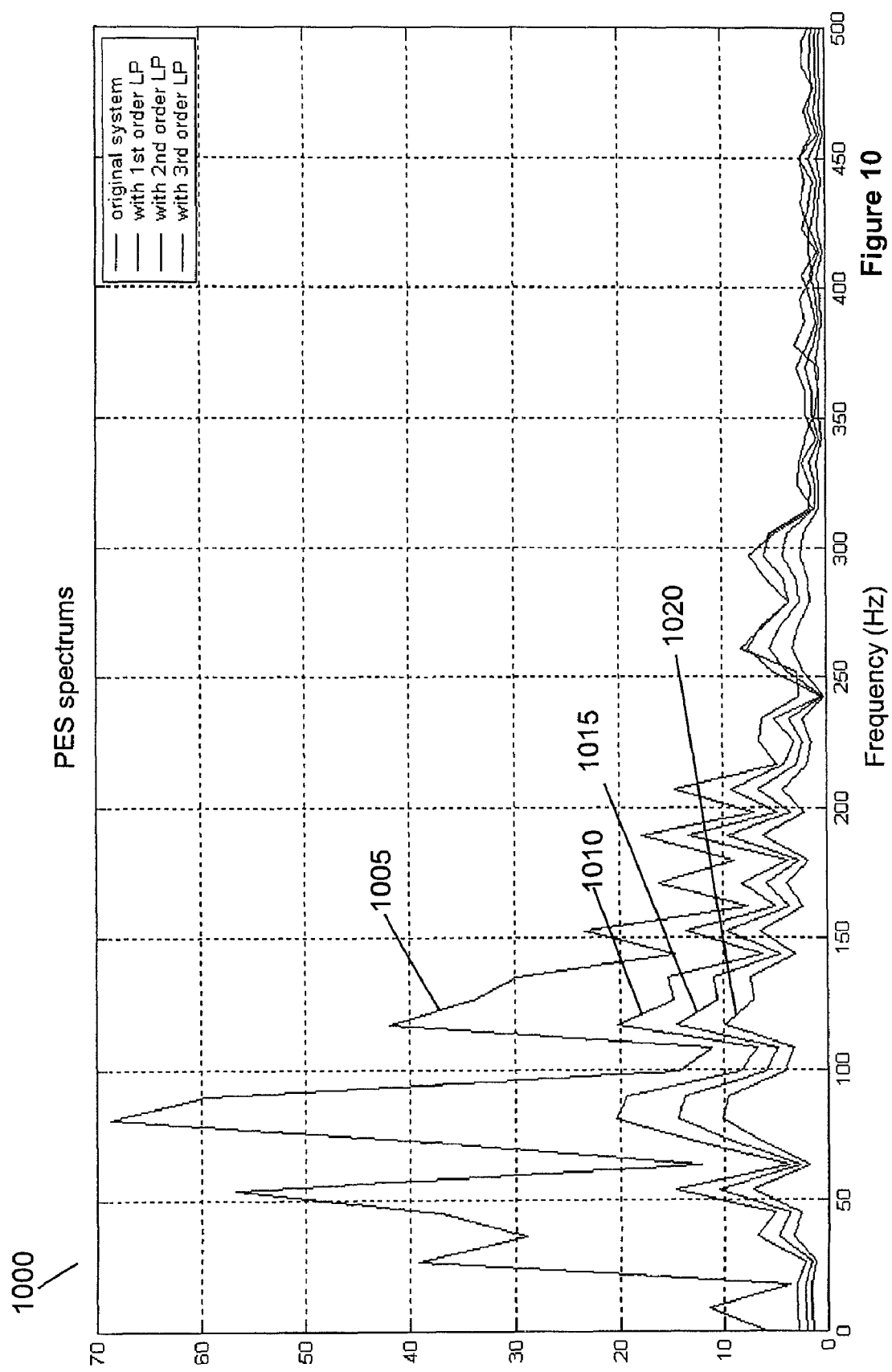
FIG. 10 illustrates a graph showing disturbance rejection at low frequencies.

FIG. 10 illustrates graph 1000 showing the PES spectrums using different order low pass filters in a feedback loop in accordance with a system as described herein. Line 1005 shows the PES spectrum of an open loop system with no filter. Line 1010 shows the PES spectrum using a first order low pass filter or the special case of an added integrator. Line 1015 shows the PES spectrum using a second order low pass filter. Line 1020 shows the PES spectrum using a third order low pass filter.

Graphs 900 and 1000 show that disturbance rejection at low frequencies is slightly worse using higher ordered low pass filters than when an integrator is used. However, higher order low pass filters provide no significant disturbance amplification in middle frequencies (from about 1,000 Hz to about 3,000 Hz) and no significant loss in gain margins and phase margins.

The above is a description of embodiments of a low frequency booster for RV/shock/friction disturbance rejection in accordance with a system as described herein.

What is claimed is:

1. A system for removing low frequency disturbance signals from a control signal for a plant, said system comprising:
a controller that generates said control signal;
a mixer connected to said controller to receive said control signal;
a feedback loop that connects an output of said mixer to an input of said mixer; and
a low pass filter in said feedback loop that allows said low frequency disturbance signals in said control signal output from said mixer
to pass through said feedback loop and
to be added to said control signal by said mixer for handling by said controller.

2. The system of claim 1, further comprising:
delay circuitry in said feedback loop.

3. The system of claim 1, further comprising:
a hold circuit connected to said output of said mixer.

4. The system of claim 3, wherein said hold circuit is between said output of said mixer and said plant.

5. The system of claim 1, further comprising: a feedback loop from said plant to said controller to provide said control signal applied to said plant to said controller for use in generating said control signal.

6. The system of claim 5, further comprising: a sample circuit in said feedback loop from said plant to said controller.

7. The system of claim 1, further comprising: a plurality of low pass filters, including said low pass filter, wherein each low pass filter from said plurality of low pass filters has an order selected from a finite plurality of orders.

8. The system of claim 7, further comprising: a switch for selectively connecting one of said low pass filters from said plurality of low pass filters into said feedback loop to act as said low pass filter in said system.

9. The system of claim 8, further comprising: a switch controller connected to said switch to move said switch between low pass filters from said plurality of low pass filters.

10. The system of claim 8, wherein said switch connects said one of said plurality of low pass filters having a lower order into said feedback loop for better rejection of said low frequency disturbance signals.

11. The system of claim 8, wherein said switch connects said one of said plurality of low pass filters having a higher order for a higher stability margin.

12. The system of claim 8, wherein said one of said plurality of low pass filters is selected based on a level of said low frequency disturbance signals.

13. The system of claim 8, wherein said one of said plurality of low pass filters is selected for a desired level of stability margins based on a level of said low frequency disturbance signals.

14. A method for removing low frequency disturbance signals from a control system, said method comprising:
tapping a control signal generated by a controller;
isolating said low frequency disturbance signals from said control signal; and
adding said isolated low frequency disturbance signals to said control signal.

15. The method of claim 14, further comprising: delaying said low frequency disturbance signals by a desired period prior to adding said isolated low frequency disturbance signals to said control signal.

16. The method of claim 14, further comprising: sampling said control signal in response to said adding said isolated low frequency disturbance signals to said control signal.

17. The method of claim 14, further comprising: holding said control signal in response to said adding said isolated low frequency disturbance signals to said control signal.

18. The method of claim 14, further comprising: feeding back said control signal applied to a plant including said added isolated low frequency disturbance signals to said controller for use in generating said control signal.

19. The method of claim 18, wherein said one of said plurality of low pass filters is selected for a desired stability margin.

20. The method of claim 14, wherein said step of isolating comprises:
selecting one of a plurality of low pass filters to isolate said low frequency disturbance signals, wherein each of said plurality of low pass filters is one of a finite plurality of orders.

21. The method of claim 20, wherein said one of said plurality of low pass filters selected has a lower order for better rejection of said low frequency disturbance signals.

22. The method of claim 20, wherein said one of said plurality of low pass filters selected has a higher order for a higher stability margin.

23. The method of claim 20, wherein said one of said plurality of low pass filters is selected based on a level of said low frequency disturbance signals.

24. The method of claim 14, further comprising:
adjusting said control signal generated by said controller to account for said low frequency disturbance signals above a desired level.

25. An apparatus for removing low frequency disturbance signals from a control signal for a plant, said apparatus comprising:
means for generating said control signal;
means for receiving said control signal;
means for isolating said low frequency disturbance signals in said received control signal; and
means for adding said isolated low frequency disturbance signals to said control signal.

26. The apparatus of claim 25, further comprising: means for delaying said isolated low frequency signals.

27. The apparatus of claim 25, further comprising: means for holding said control signal with said isolated low frequency disturbance signals added.

28. The apparatus of claim 27, wherein said means for holding is between said means for receiving and said plant.

29. The apparatus of claim 25, further comprising: means for feeding back said control signal from said plant to said means for generating to provide said control signal applied to said plant to said means for generating for use in generating said control signal.

30. The apparatus of claim 29, further comprising: means for sampling said control signal being fed back from said plant to said means for generating.

31. The apparatus of claim 25, further comprising: a plurality of means for isolating said low frequency disturbance signals including said means for isolating said low frequency disturbance signals, wherein each of said means for isolating has an order selected from a finite plurality of orders.

32. The apparatus of claim 31, further comprising: means for selectively connecting said one of said means for isolating said low frequency disturbance signals to said means for receiving said control signal to isolate said low frequency disturbance signals.

33. The apparatus of claim 32, wherein said one of said means for isolating has a lower order for better rejection of said low frequency disturbance signals.

34. The apparatus of claim 32, wherein said one of said means for isolating has a higher order for a higher stability margin.

35. The apparatus of claim 32, wherein said one of said means for isolating is selected based on a desired level of rejection of said low frequency disturbance signals.

36. The apparatus of claim 32, wherein said one of said means for isolating is selected for a desired stability margin.

* * * * *